(12) United States Patent
Brown et al.

(10) Patent No.: US 7,114,608 B2
(45) Date of Patent: Oct. 3, 2006

(54) DIRECTIONAL TRANSITION MODULE FOR USE IN CONJUNCTION WITH A ROLLER-TYPE CONVEYOR

(75) Inventors: Thomas M. Brown, Vestal, NY (US); Richard T. Evans, Endicott, NY (US); Kenneth E. Gluck, Vestal, NY (US); Douglas G. Miller, Vestal, NY (US); Eugene Stradley, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 232 days.

(21) Appl. No.: 10/802,263

(22) Filed: Mar. 16, 2004

(65) Prior Publication Data

US 2005/0126885 A1 Jun. 16, 2005

Related U.S. Application Data

(60) Provisional application No. 60/455,208, filed on Mar. 17, 2003.

(51) Int. Cl.
*B65G 47/34* (2006.01)
*B65G 15/12* (2006.01)

(52) U.S. Cl. .................. 198/370.1; 198/809
(58) Field of Classification Search ........... 198/370.08, 198/370.1, 809
See application file for complete search history.

(56) References Cited

U.S. PATENT DOCUMENTS

| | | | |
|---|---|---|---|
| RE25,673 E | 11/1964 | Burt | |
| 3,469,887 A | 9/1969 | Nakahara et al. | |
| 4,633,996 A | 1/1987 | Waterhouse | |
| 4,819,782 A | 4/1989 | Fenner | |
| 5,165,516 A * | 11/1992 | Reed et al. | 198/370.1 |
| 5,699,892 A * | 12/1997 | Shyr et al. | 198/370.09 |
| 5,971,132 A * | 10/1999 | Bonnet | 198/370.07 |
| 6,016,903 A | 1/2000 | Lochbrunner | |
| 6,793,927 B1 * | 9/2004 | Briggs et al. | 424/255.1 |
| 2002/0134646 A1 | 9/2002 | Itoh | |
| 2004/0226803 A1 * | 11/2004 | Brixius et al. | 198/370.1 |

* cited by examiner

*Primary Examiner*—Eileen D. Lillis
*Assistant Examiner*—Mark A. Deuble
(74) *Attorney, Agent, or Firm*—Louis J. Franco; Leland D. Schultz; Patrick M. Hogan

(57) ABSTRACT

A directional transition module for moving an article translating on a primary roller conveyor extending along a first axis to a secondary conveyor for translation along a second axis angularly disposed with respect to the first axis includes at least one flexible drive member supported by a chassis for cycling through a predetermined driver cycle having an upper cycle portion and a lower cycle portion. The upper cycle portion is such that, when the directional transition module is installed for use in conjunction with the primary roller conveyor, the drive member cycles between first and second rollers of the primary roller conveyor. The drive member includes first and second segments wherein the first segment has a profile sufficiently low such that, when the first segment cycles through the upper cycle portion, it does not extend above a plane defined by the tops of the first and second rollers. The second segment has a profile sufficiently high such that, when the second segment cycles through the upper cycle portion, at least one section of the second segment extends above the plane defined by the tops of the first and second rollers to engage and at least partially lift the article for directional transition.

19 Claims, 9 Drawing Sheets

End view schematic of plural-motor, bi-directional transition module

DIRECTIONAL TRANSITION MODULE FOR USE IN CONJUNCTION WITH A ROLLER-TYPE CONVEYOR

PROVISIONAL PRIORITY CLAIM

Priority based on Provisional Application Ser. No. 60/455,208, filed Mar. 17, 2003, and entitled "MATERIAL TRANSFER MODULE," is claimed.

BACKGROUND

1. Field

Although not so limited in its utility or scope, implementations of the present invention are particularly well suited for incorporation in material sortation systems such as those used in moving mail pieces through various stages of processing in a mail processing facility, for example, and, in particular, in conjunction with a roller conveyor.

2. Brief Description of an Illustrative Environment and Related Art

Material handling operations frequently involve the use of transport systems including networks of conveyor belts and roller conveyors. In a typical conveyor system, a primary roller conveyor extending along a first axis can have one or more secondary belt or roller conveyors adjacent thereto and in transporting communication therewith. Various apparatus have been previously employed for facilitating the automated transfer or diversion of articles from a primary roller conveyor to a secondary conveyor or a receptacle adapted for collecting the articles being conveyed, for example.

A traditional set of transfer apparatus used in combination with a section of primary roller conveyor is capable of transferring conveyed articles to another, secondary conveyor that moves articles in a direction orthogonal to the direction of conveyance of articles on the primary conveyor. In order to reduce wear and potential impact damage to articles being orthogonally transferred, an elevatory right-angle transfer device temporary lifts an article being transferred above the plane defined by the tops of the rollers in the direction transition region of the primary conveyor and then transfers the article to the adjacent, orthogonally extending conveyor. Many extant transfer apparatus perform the lifting and transfer operations with distinct mechanisms. For example, an electric or pneumatic lift mechanism lifts the article and a transfer mechanism engages and moves the article to the adjacent conveyor.

At least one attempt at combining lifting and right-angle moving operations employs a plurality of composite chains that are moved along planes extending between adjacent rollers carried by a section of roller conveyor with which the device cooperates. As explained in the abstract of U.S. Pat. No. 5,699,892 to Shyr et al., each composite chain, which is driven by a driving sprocket, "is formed by combining a regular chain with a roller chain which has a plurality of free rollers to an outer side thereof. Each composite chain is located between two adjacent rollers of the roller conveyor with the free rollers movable to be higher than the conveyance surface of the conveyor while the regular chain (is) lower than the conveyance surface so that when the motor drives . . . the chains via the sprockets, the free rollers are moved to be higher than the conveyance surface to contact and raise a conveyed article . . . thus achieving the shifting operation including vertically elevating and horizontally moving."

Although the device described in U.S. Pat. No. 5,699,892 appears to address various shortcomings of previous orthogonal transfer devices, it may not be suitable for the transfer of certain articles. For example, cardboard containers and even some plastic bins, if sufficiently weighted, may be damaged by the free rollers of the composite chain. Furthermore, the composite chains undoubtedly add to the weight and expense of the device. Moreover, the movement of numerous composite chains of the type described in the '892 contributes to the overall noise level of the material handling environment in which they are used.

In addition to the orthogonal transfer of articles, conveyor systems often required the diversion of articles at angles of less than 90 degrees (e.g., 30° and 45° are two of the most common diversion angles). As with 90-degree transfer apparatus, various devices have been previously developed for the diversion of articles to adjacent branch conveyors. Traditionally, however, two different types of apparatus have been used at transfer and diversion junctions.

Accordingly, there exists a need for a simplified directional transition module that can accomplish package lift and transfer and diversion using a single set of like mechanisms as opposed to a first set of mechanisms for accomplishing package lifting and a second set of mechanisms to accomplish package transfer.

SUMMARY

In a typical embodiment, a directional transition module includes a chassis supporting at least one endless flexible drive member for selective cycling through a driver cycle including an upper cycle portion and a lower cycle portion. When the directional transition module is installed for use in a typical environment, the upper portion of the driver cycle is such that a cycling flexible drive member passes between first and second rollers of a pair of rollers rotatably supported by a roller conveyor module. Each endless flexible drive member includes a first segment having a first segment profile and a second segment having a second segment profile and cycles about a predetermined path at least a portion of which path extends between a pair of rollers in the direction transition region of a roller conveyor such that, as the flexible drive member cycles, the full lengths of the first and second segments of the drive member alternately pass between the first and second rollers of the roller pair. The second segment has a profile that extends above a plane defined by the tops of the first and second rollers between which that flexible drive member cycles. The profile of the first segment is sufficiently low that, as the first segment cycles between the first and second rollers, no portion thereof extends above the plane defined by the tops of the first and second rollers between which the flexible drive member cycles.

An article destined to remain on the roller conveyor with which the directional transition module cooperates is carried by the rollers of the roller conveyor over the first segment of each stationary flexible drive member without contact between the article and the drive member because the low profile of the first segment ensures that the article passing over remains out of contact with the flexible drive member. Contrarily, as an article to be transferred or diverted to a predetermined secondary conveyor approaches a corresponding directional transition module, the article is detected by, for example, a photo-eye and a signal to activate is communicated to the directional transition module. In various implementations, each drive member of a selected set of drive members (e.g. all or fewer than all drive members in the directional transition module) is caused to cycle in response to a signal as the article to be transferred is disposed over that drive member. As that drive member cycles from a position in which the first segment of the drive member is between the first and second rollers to a position in which the second segment of the drive member is cycled between the rollers, the relatively high profile of the second segment of the drive member lifts the article to be transferred above the tops of the first and second rollers between which that drive member cycles. The frictional engagement of the moving second segment with the lifted article transfers the article to the predetermined secondary conveyor. The drive member continues to cycle until the first segment is again disposed between the first and second rollers in the upper cycle portion at which time the drive member ceases cycling and remains stationary until a subsequent signal communicated to the directional transition module causes the drive member to cycle again.

In various illustrative embodiments, each flexible drive member is a belt including inside and outside surfaces. In alternative versions, each belt is made from a flexible, durable material that facilitates a predetermined minimum coefficient of friction between the outside surface of the belt and articles to be transferred. An illustrative, non-limiting group of materials from which each belt can be fabricated includes rubber, nylon, polyester, urethane, polyurethane, plastic or any suitable polymeric material. Moreover, in alternative versions, the belt is variously configured. For example, in one illustrative version, the second segment includes a series of tooth-like protrusions having distal ends that extend above the plane defined by the tops of two rollers as the second segment cycles through the upper cycle portion. In an alternative version, the belt is simply thicker between the inside and outside surfaces in the second segment than it is in the first segment. In still a third, non-limiting version, the belt includes teeth along the inside surface but is non-toothed and relatively smooth along the outside surface.

In various embodiments, the plural flexible drive members of a directional transition module are variously timed to facilitate an article's diversion at a predetermined orientation with respect to the secondary conveyor to which that article is to be diverted. For purposes of comprehension, consider a directional transition module having five drive members. According to one illustrative implementation, the five drive members begin cycling simultaneously and cycle at the same rate (i.e., length of drive member per unit time) in response to a signal communicated to the directional transition module. Depending on the position of the article upon the roller conveyor module at the instant the drive members begin to cycle, the orientation of the article will be changed because the second segments of the drive members will be in contact with the article for different lengths of time, thereby imparting disparate degrees of lateral movement on the article. It will be appreciated that the angular deviation of the motion of the article with respect to the initial translation axis can be controlled with at least some measure of predictability by varying one or both of (i) the start times of the cycling of the drive members and (ii) the speed of the drive members and such implementations are within the scope and contemplation of the invention.

In still additional embodiments, a single bi-directional transition module is adapted to service more than one secondary conveyor module. For instance, a first secondary conveyor may extend away from the left side of the primary conveyor at a first angle (e.g., 30°, 45° or 90°) while a second secondary conveyor extends away from the right side of the primary conveyor at a second angle (e.g., 30°, 45° or 90°). Drive members whose second segments are cycling toward the left through the upper cycle portion directionally transition an article translating along the primary conveyor module to the first secondary conveyor. Conversely, drive members whose second segments are cycling to the right through the upper cycle portion directionally transition an article translating along the primary conveyor module to the second secondary conveyor. In one alternative embodiment, at least one flexible drive member is dedicated to left-side article transfers and at least one flexible drive member is dedicated to right-side article transfers. In an alternative embodiment, at least one flexible drive member can be caused to cycle in either direction in response to a signal such that that flexible drive member cycles to affect both left-side and right-side article transfers. The following paragraphs more completely summarize aspects of illustrative, non-limiting bi-directional transition modules adapted for changing the translation direction of an article translating on a primary roller conveyor along a first axis to a selected one of (i) a first secondary conveyor adjacent the left side of the primary conveyor for translation along a second axis angularly disposed at a first angle with respect to the first axis and a (i) a second secondary conveyor adjacent the right side of the primary conveyor for translation along a third axis angularly disposed at a second angle with respect to the first axis.

In a first embodiment, a bi-directional transition module includes a motor that is alternatively energizable for rotation in first and second opposite rotation directions. For instance, if an article approaching the direction transition region of a primary conveyor is to be transferred or diverted to the left with respect to its direction of translation on the primary conveyor, the motor is energized at a predetermine time for rotation in a first direction to cause a set of drive members to cycle such that the second regions of the drive members lift and move the article to the left. Conversely, if an approaching article is to be transferred or diverted to the right, the motor is energized for rotation in the second, opposite direction thereby causing the set of drive members to lift and urge the article to the right.

In a second alternative embodiment, a bi-directional transition module includes a chassis and first and second drive-member sets supported for cycling by the chassis. Each drive-member set includes at least one endless flexible drive member supported by the chassis for cycling through a predetermined driver cycle having an upper cycle portion and a lower cycle portion. The upper cycle portion is such that, when the bi-directional transition module is installed for use in conjunction with a primary roller conveyor, each flexible drive member cycles between first and second rollers of the primary roller conveyor. As with previously described uni-directional embodiments, each flexible drive member includes a first segment and a second segment. The first segment has a profile sufficiently low such that, when the first segment cycles through the upper cycle portion, no section of the first segment extends above a plane defined by the tops of the first and second rollers. Conversely, the second segment has a profile sufficiently high such that, when the second segment cycles through the upper cycle portion, at least one section of the second segment extends above the plane defined by the tops of the first and second rollers so as to enable frictional engagement with an article to be directionally transitioned. In the particular embodiment currently under consideration, each flexible drive member of the first drive-member set cycles through the upper cycle portion in a first cycling direction orthogonal to the first axis and each flexible drive member of the second drive-member set cycles through the upper cycle portion in a second cycling direction anti-parallel to the first direction. Moreover, in a typical version, the cycling of each drive member in the first drive-member set is mutually exclusive with the cycling of each drive member in the second drive member set.

In various versions including at least two oppositely-cycling sets of drive members, the drive members of the first drive-member set are driven by a first common drive shaft dedicated to rotation in a single first rotation direction. Similarly, the drive members of the second drive-member set are driven by a second common drive shaft dedicated to rotation in a single second rotation direction opposite the first rotation direction. Moreover, in a typical version, the first and second common drive shafts are driven by separate motors. In some implementations, drive members of the first and second drive member sets are interspersed. For instance, in one version, as viewed along the translation direction of the primary roller conveyor, drive members of the first and second drive-member sets appear in alternating relationship. In other versions, all of the drive members of one of the first and second drive-member sets are serially arranged without interruption by drive members of the other set and that uninterrupted drive-member set is followed by an uninterrupted series of drive members of the other of the first and second drive-member sets.

Representative embodiments are more completely described and depicted in the following detailed description and the accompanying drawings.

DETAILED DESCRIPTION

The following description of various embodiments of a directional transition module is illustrative in nature and is therefore not intended to limit the scope of the invention or its application of uses.

Figure 1:
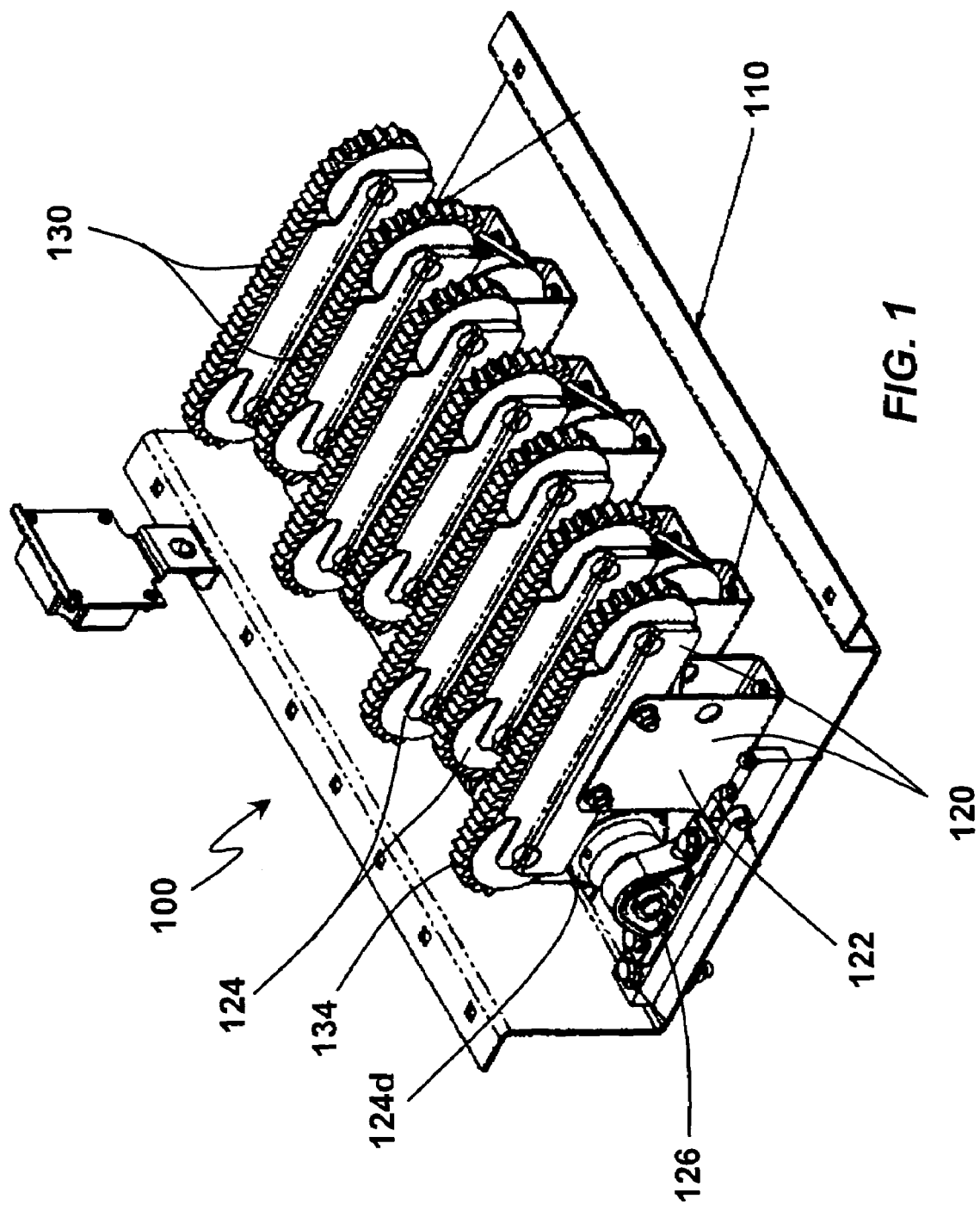
FIG. 1 depicts an illustrative directional transition module.
Figure 2:
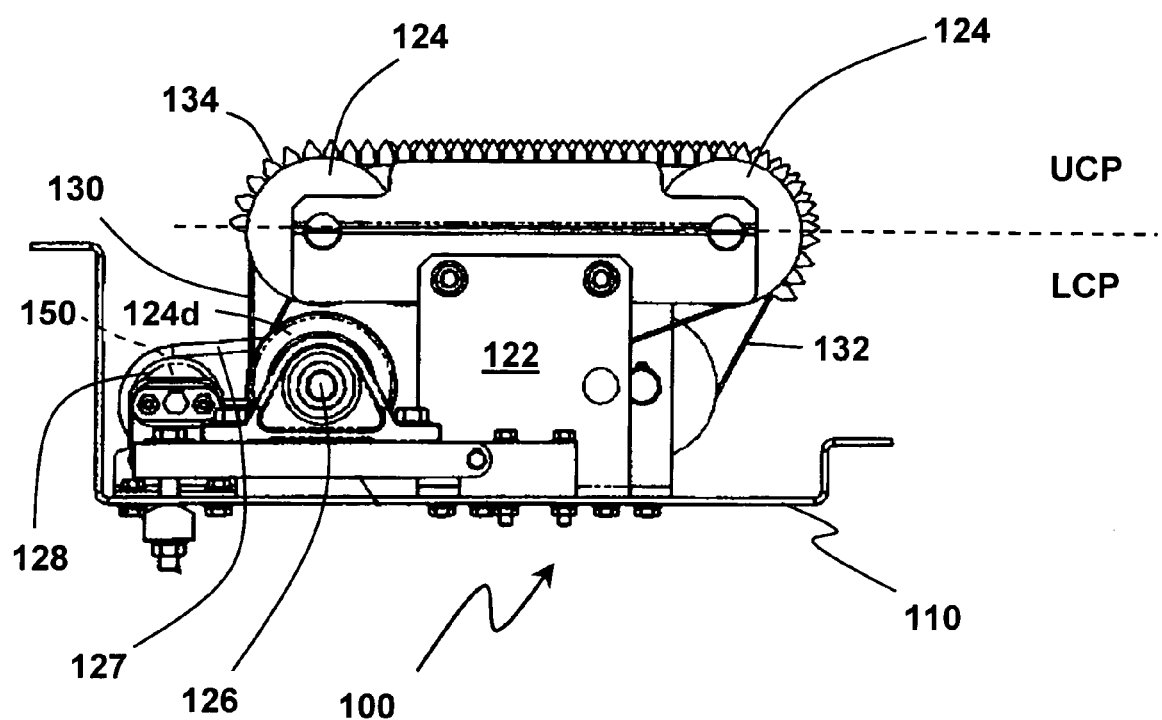
FIG. 2 is a side view of the illustrative directional transition module depicted in FIG. 1.

Referring to FIG. 1, an illustrative directional transition module 100 includes a chassis 110 supporting a plurality of driver assemblies 120. Each driver assembly includes a base 122 rotatably supporting a set of wheels 124 (e.g., pulleys) defining the cycling path and enabling the cycling of an endless flexible drive member 130. At least one of the wheels 124 of each driver assembly 120 is a drive wheel 124d that is linked to a drive motor 150 (not shown in FIG. 1) either directly or through intermediate drive linkages. In the illustrative embodiment of FIGS. 1 and 2, for example, one wheel 124d of each driver assembly 120 is carried for rotation by a common drive shaft 126 carrying for rotation the drive wheels 124d of other driver assemblies 120 among the plurality of driver assemblies 120. In the illustrative version of FIG. 2, a flexible mechanical linkage member 127 links the common drive shaft 126 to a primary drive shaft 128, which primary drive shaft 128 includes an internal drive motor 150 (not visible, location indicated by dashed lead line). In some alternative embodiments, the common drive shaft 126 and the primary draft 128 are one and the same and the motor is contained within the common drive shaft 126 in an arrangement similar to that of a power roller in a power roller conveyor of which those of ordinary skill in the relevant art are sufficiently aware so as to obviate that need for further explanation. In still other embodiments, either a common drive shaft 126 or a primary drive shaft 128 is linked to an external motor (not shown). As shown in FIG. 2, the cycle of each flexible drive member 130 is defined so as to include an upper cycle portion UCP and a lower cycle portion LCP, the significance of which will be explained in greater detail further in this description.

Figure 1A:
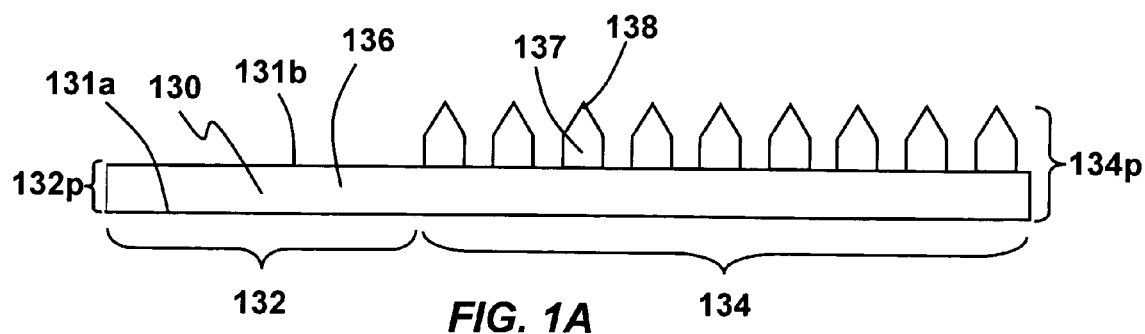
FIG. 1A shows a section of an endless flexible drive member in the form of a belt having a first belt segment profile and a toothed second belt segment profile higher than the first belt segment profile.
Figure 1B:
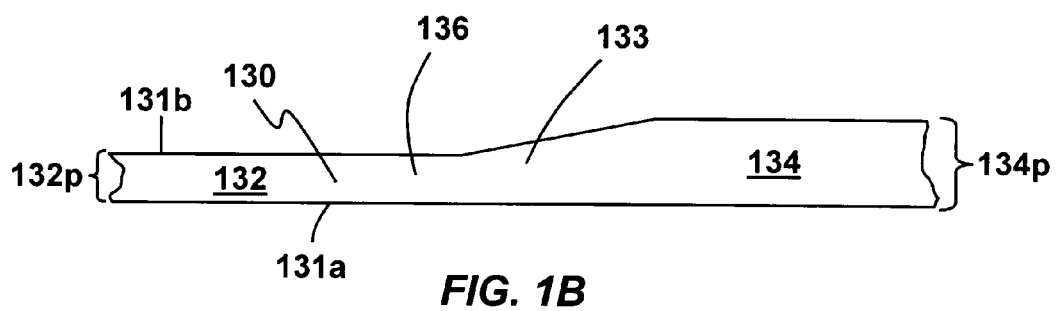
FIG. 1B shows a section of belt having a first segment joined through a tapered transition region with a second segment thicker than the first segment.
Figure 1C:
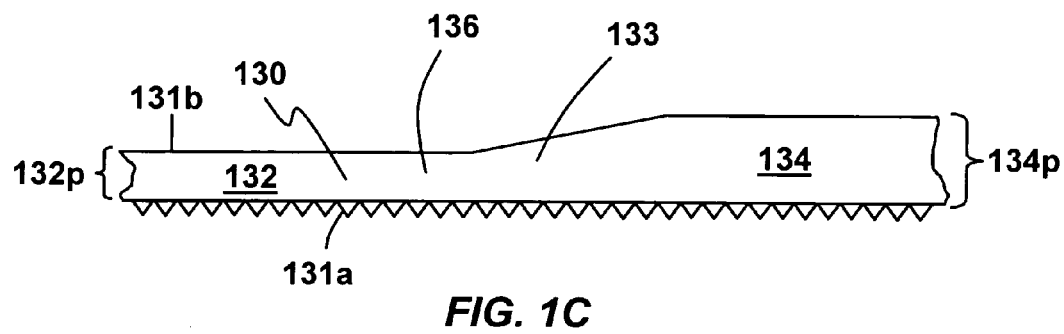
FIG. 1C shows a section of belt having a first segment joined through a tapered transition region with a second segment thicker than the first segment and a toothed inside surface.

Although the flexible drive members 130 may be variously configured, each of the illustrative flexible drive members 130 of FIGS. 1A, 1B and 1C includes inside and outside surfaces 131a and 131b and a first segment 132 and a second segment 134 having, respectively, a first segment profile 132p and a second segment profile 134p. Moreover, each of the illustrative drive members 130 shown in FIGS. 1A through 1C is a belt 136. Referring to the illustrative belt 136 of FIG. 1A, the second segment 134 includes a series of tooth-like protrusions 137 having distal ends 138 that engage an article for directional transition as the second segment 134 cycles through the upper cycle portion UCP. In the alternative belt 136 of FIG. 1B, the inside and outside surfaces 131a and 131b are non-toothed and relatively smooth and the belt 136 is simply continuously thicker in the second segment 134 than it is in the first segment 132. Furthermore, in the particular version of FIG. 1B, there is a tapered transition region 133 between the first and second segments 132 and 134 as opposed, for example, to an abrupt step in thickness, although versions including the latter are within the scope and contemplation of the invention. It will be more fully appreciated further in this description that such a tapered region 133 facilitates smoother and less abrupt package lifting. Referring to still a third, non-limiting version as shown in FIG. 1C, a belt 136 includes teeth along the inside surface 131a but is non-toothed and relatively smooth along the outside surface 131b. The teeth on the inside surface 131a are adapted for interlocking engagement with similarly dimensioned teeth depending from the belt-engaging portion of a toothed wheel 124.

Figure 3:
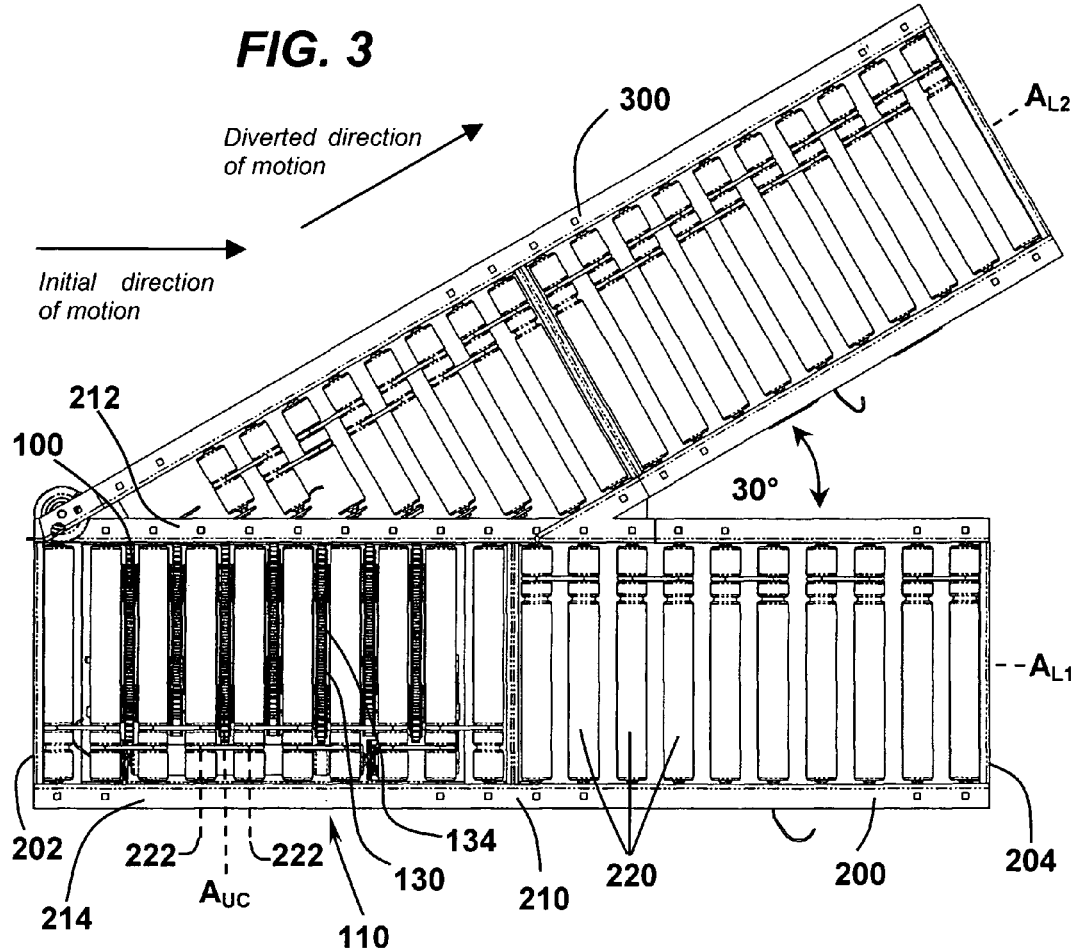
FIG. 3 is a top view of a directional transition module and a primary roller conveyor module cooperatively coupled to facilitate the diversion of articles from the primary roller conveyor module to the secondary conveyor module extending away from the primary conveyor module at an angle of 30°.

Referring to FIG. 3, a directional transition module 100 is shown supported in a fixed position with respect to a primary roller conveyor module 200. The primary roller conveyor module 200 includes a roller support structure 210 having first and second (e.g., left and right side) elongated frame members 212 and 214 extending along a first longitudinal axis $A_{L1}$ between first and second ends 202 and 204 of the roller conveyor module 200. In the illustrated implementations, the chassis 110 of the directional transition module 100 is fastened (e.g., bolted) directly to the frame members 212 and 214 of the roller support structure 210, although it will be readily appreciated that the directional transition module 100 can be alternatively fixed with respect to the primary roller conveyor module 200, such as through the securing of both the roller conveyor module 200 and the directional transition module 100 to a third rigid structure (not shown).

Figure 4:
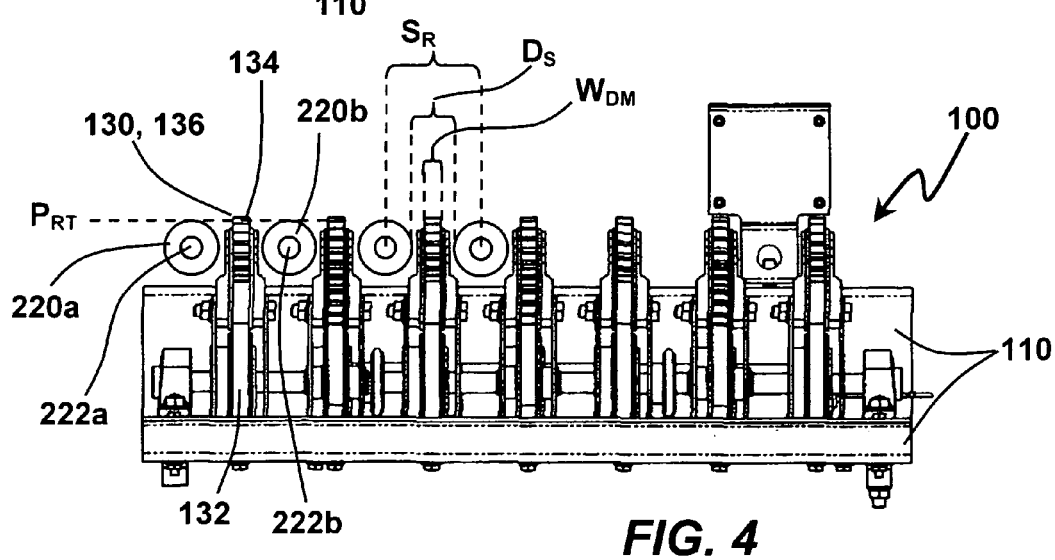
FIG. 4 is a side view showing a selected set of flexible drive members of the directional transition module of FIG. 3 in the spaces between each pair of a selected set of rollers carried by the primary roller conveyor module.

The roller support structure 210 supports a plurality of rollers 220, each of which rollers 220 rotates about a roller axis 222 perpendicular to the first longitudinal axis $A_{L1}$ and parallel to the roller axes 222 of other rollers 220 among the plurality of rollers 220. As shown in FIG. 4, the roller axes 222 are spaced in accordance with a predetermined roller spacing $S_R$ and each roller 220 is smaller in diameter than the roller spacing $S_R$ such that the rollers 220 are spaced apart by separation distance Ds.

As shown in FIG. 3 and the side view of FIG. 4, each flexible drive member 130 has a width $W_{DM}$ that is narrower than the roller separation distance Ds such that the flexible drive member 130 can cycle between, for example, first and second rollers 220a and 220b. Moreover, when the directional transition module 100 is cooperatively fixed in position with respect to the primary roller conveyor module 200, the upper cycle portion UCP and the first and second segment profiles 132p and 134p of each flexible drive member 130 are such that (i) when the first segment 132 cycles through the upper cycle portion UCP along an upper cycle axis $A_{UC}$ extending along the first and second roller axes 222, no section of the first segment 132 extends above a roller top plane $P_{RT}$ defined by the tops of the first and second rollers 222a and 222b, and (ii) when the second segment 134 cycles through the upper cycle portion UCP, at least one section of the second segment 134 extends above the roller top plane $P_{RT}$. Although, as previously described, the flexible drive members 130 may be variously configured, the flexible drive members 130 installed on various illustrated directional transition modules 100 are belts 136, the second segments 134 of which include series of tooth-like protrusions 137 having distal ends 138 that extend above the roller top plane $P_{RT}$ to achieve the higher second segment profile 134p for lifting an article above the rollers 220 and moving it to an adjacent secondary conveyor in order to change its translation direction.

In the example of FIG. 3, the primary roller conveyor module 200 is joined to a secondary conveyor module 300 that extends longitudinally along a secondary module axis $A_{L2}$. Although in the illustrative arrangement of FIG. 3, the secondary module axis $A_{L2}$ is disposed at an angle of 30° with respect to the first longitudinal axis $A_{L1}$, it is to be understood that alternative arrangements involving one or more secondary conveyor modules 300 extending along axes disposed at angles other than 30° are within the scope and contemplation of the invention. Moreover, the secondary conveyor modules 300 to which articles are to be transferred or diverted from the primary roller conveyor 100 need not be roller conveyor modules themselves, but could be, for example, belt conveyors. Alternatively, the directional transition module 100 may transfer articles to chutes or even drop-off receptacles adapted for containing transferred articles.

Some alternative embodiments include drive members 130 having driver cycles defined so as to include an apex within an arch or at the junction between two slopes as the drive member 130 cycles through the upper cycle portion UCP. In the illustrative bi-directional transition module 100 of FIG. 5, the upper cycle portion UCP includes an apex $A_{UCP}$ that assists in lifting and urging to one side an article as the second segment 134 of the drive member 130 cycles through the upper cycle portion UCP. In the particular version depicted, the apex $A_{UCP}$ is achieved by a drive-member guiding surface 129 depending from the base 122 that supports the wheels 124. It will be appreciated that inclusion of an apex $A_{UCP}$ can be achieved by alternative apparatus such as an additional wheel (not shown) by way of non-limiting example. Moreover, although the apex $A_{UCP}$ is shown on a bi-directional embodiment, it will be appreciated that this is only for illustrative purposes and that a uni-directional embodiment may also include an upper cycle portions UCP having an apex $A_{UCP}$.

As described in the summary, bi-directional transition modules are adapted to service more than one secondary conveyor module. More specifically, and with temporary reference to FIGS. 6 and 7, variously embodied bi-directional transition modules 100 are adapted for changing the translation direction of an article A translating on a primary roller conveyor 100 along a first axis $A_{L1}$ by moving the article A to a selected one of (i) a first secondary conveyor 300 for translation along a second axis $A_{L2}$ angularly disposed at a first angle $\theta_1$ with respect to the first axis $A_{L1}$ and (ii) a second secondary conveyor 400 for translation along a third axis $A_{L3}$ angularly disposed at a second angle $\theta_2$ with respect to the first axis $A_{L1}$. Although "service" and "servicing" are discussed throughout the specification primarily in terms of moving an article from a primary roller conveyor module 200 to an adjacent secondary conveyor, it is to be understood that inherent in the capacity of various embodiments to lift an article from the primary conveyor module 100 and move it to a secondary conveyor is the capacity to perform the reverse operation of receiving an article from a secondary conveyor and lowering it onto the primary conveyor module 100. Accordingly, "service" is to be interpreted sufficiently broadly to encompass both operations and, therefore, for purposes of various embodiments within the scope of the appended claims, it is to be regarded as inherent in the capacity to perform one of the operations, the capacity to perform the reverse operation.

Figure 5:
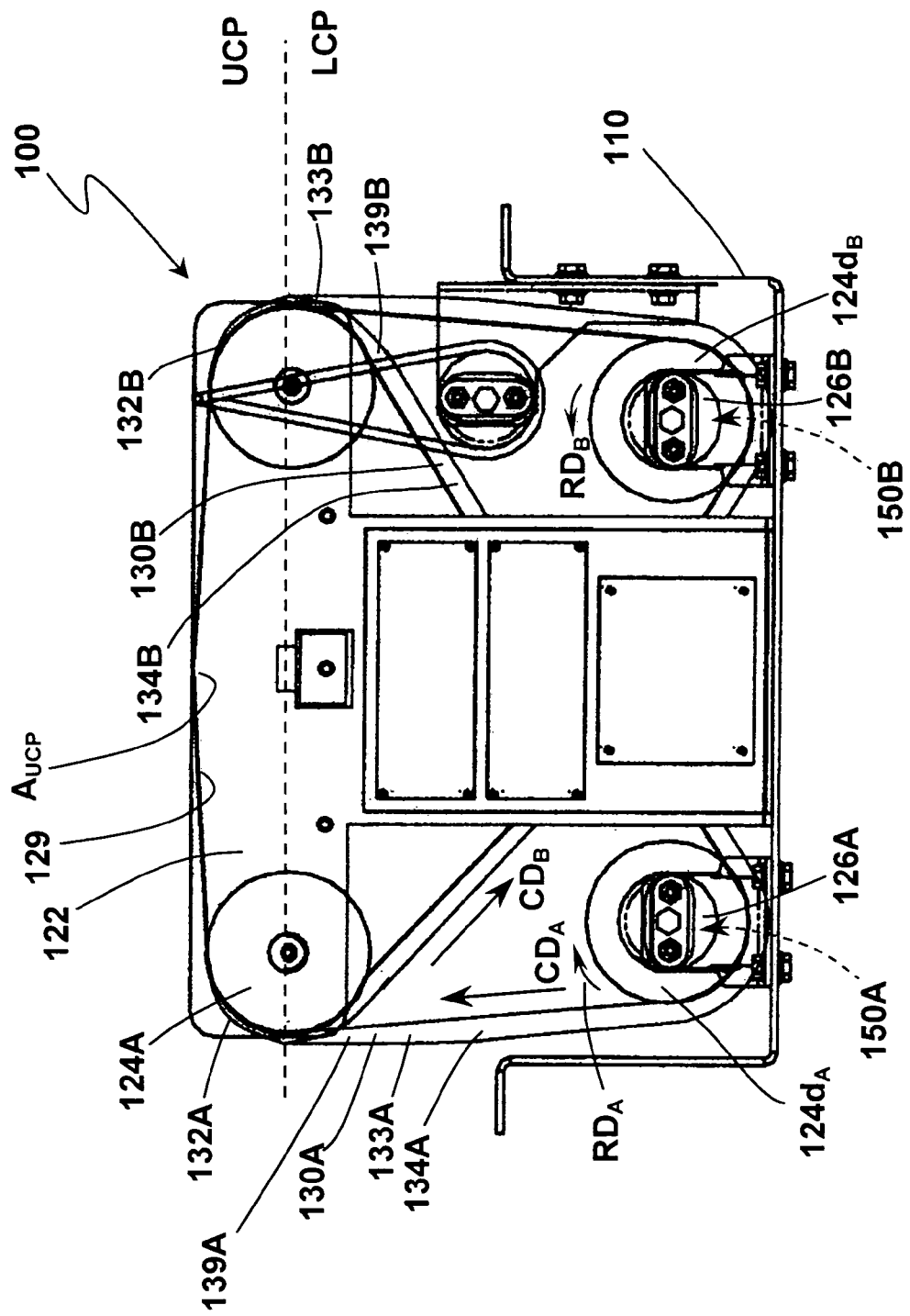
FIG. 5 is an end view of an illustrative bi-directional transition module.

An end view of an illustrative bi-directional transition module 100 is schematically depicted in FIG. 5. The bi-directional transition module 100 of FIG. 5 includes a chassis 110 supporting first and second drive-member sets 139A and 139B. Each of the first and second drive-member sets 139A and 139B includes at least one endless flexible drive member 130 supported by wheels 124 for cycling through a predetermined driver cycle having an upper cycle portion UCP and a lower cycle portion LCP. The upper cycle portion UCP and lower cycle portion LCP, and the relationship of each to a primary roller conveyor with which the bi-directional transition module 100 is used, are analogous to those previously described. Moreover, material aspects of the flexible drive members 130 carried by a bi-directional transition module 100 are consistent with those carried by a unidirectional embodiment and may, in fact, be indistinguishable. Generally, to the extent that like components of illustrative bi-directional and uni-directional embodiments have been previously described, reference is made to such previous descriptions to facilitate comprehension of bi-directional embodiments. Accordingly, relative to embodiments previously described, like reference numbering of like elements is maintained with the exception that numbers referencing elements relating to the first drive-member set 139A include the additional reference character "A" and those referencing elements relating to the second drive-member set 139B include the additional reference character "B."

Referring still to FIG. 5, each flexible drive member 130A of the first drive-member set 139A cycles in a first cycling direction $CD_A$ and each flexible drive member 130B of the second drive-member set 139B cycles in a second cycling direction $CD_B$ opposite the first cycling direction $CD_A$. As shown in the illustrative top view of FIG. 5A, the first and second cycling directions $CD_A$ and $CD_B$ are such that, when the bi-directional transition module 100 is installed for use in conjunction with a primary roller conveyor 200 extending along a first longitudinal axis $A_{L1}$, the first cycling direction $CD_A$ through the upper cycle portion UCP is orthogonal to the first longitudinal axis $A_{L1}$ and the second cycling direction $CD_B$ through the upper cycle portion UCP is antiparallel to the first cycling direction $CD_A$ as indicated by the arrows. The cycling of each drive member 130A in the first drive-member set 139A is mutually exclusive with the cycling of each drive member 130B in the second drive member set 139B.

Referring again to FIG. 5, the oppositely-cycling first and second drive-member sets 139A and 139B are driven by, respectively, a first common drive shaft 126A dedicated to rotation in a single first rotation direction $RD_A$ and a second common drive shaft 126B dedicated to rotation in a single second rotation direction $RD_B$ opposite the first rotation direction $RD_A$. Moreover, in the version of FIG. 5, the first and second common drive shafts 126A and 126B are driven by separate motors 150A and 150B that are at least partially contained inside, respectively, shafts 126A and 126B as indicated by the phantom lead lines. As shown in the top view of FIG. 5A, the flexible drive members 130A of the first drive member set 139A are alternatingly interspersed with the flexible drive members 130B of the second drive-member set 139B.

Figure 5A:
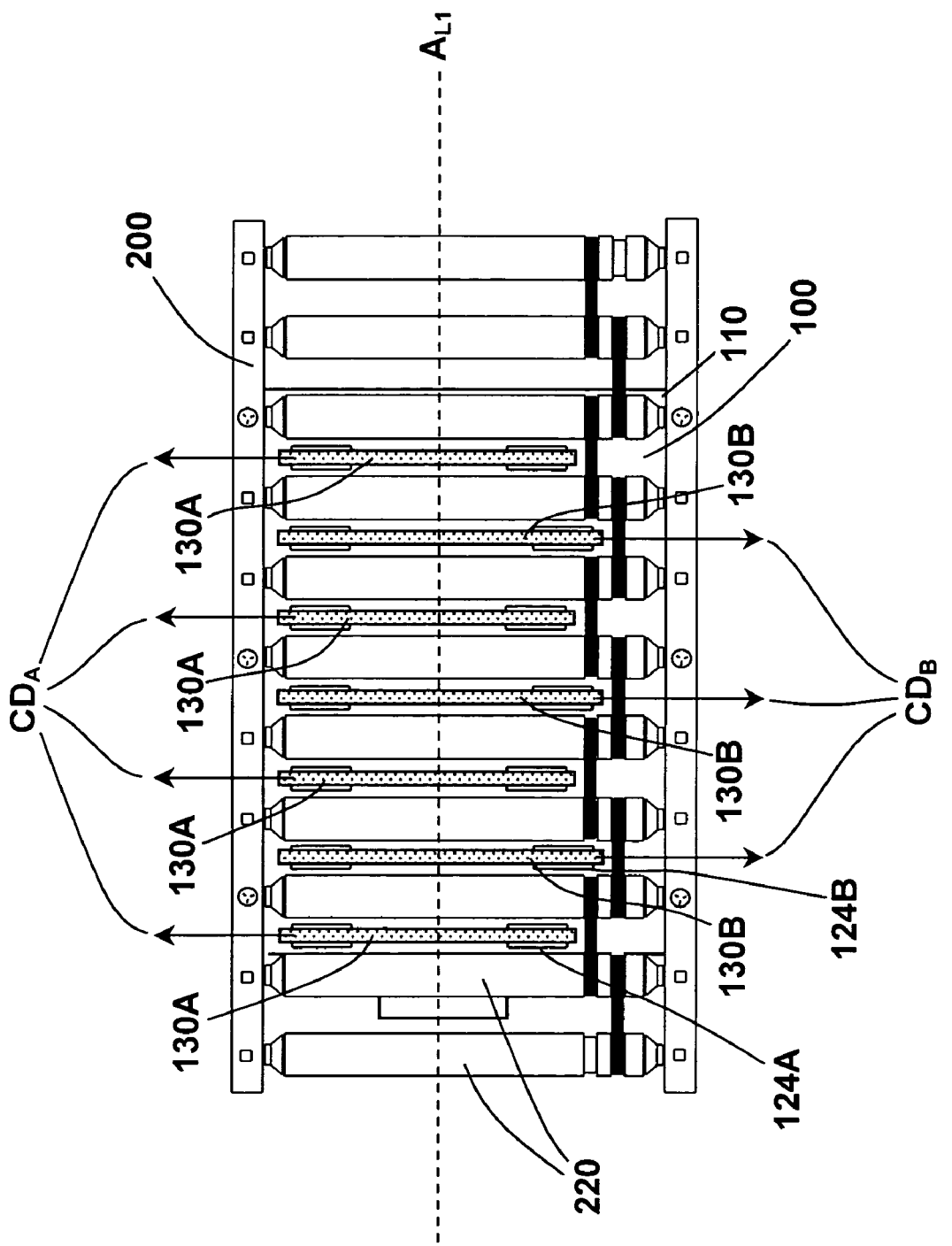
FIG. 5A is a top view of an illustrative bi-directional transition module cooperatively coupled with a primary roller conveyor.
Figure 5B:
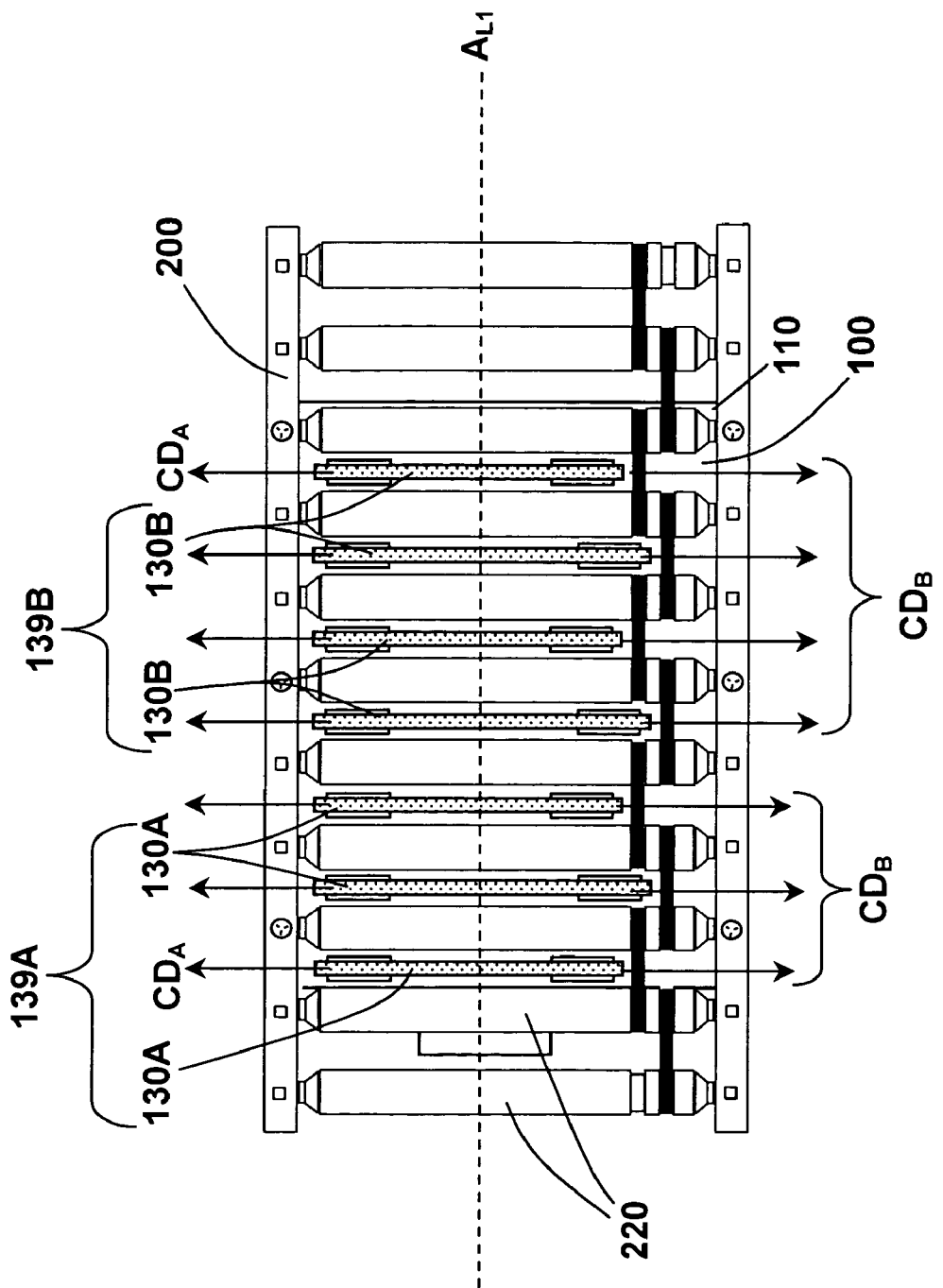
FIG. 5B is a top view of a primary roller conveyor coupled with an illustrative bi-directional transition module having serially arranged first and second, independently cyclable drive-member sets.

In some versions including independently cyclable first and second drive-member sets 139A and 139B, at least one of the drive-member sets 139A and 139B is bi-directional. In a more versatile version, each of the first and second drive-member sets 139A and 139B is bi-directional. In still additional alternative first and second versions having independently cyclable, bi-directional first and second drive-member sets 139A and 139B, (i) the flexible drive members 130A of the first drive member-set 139A are alternatingly interspersed with the flexible drive members 130B of the second drive-member set 139B and (ii) the first and second drive-member sets 139A and 139B are serially arranged. An illustrative example of the latter type is shown in FIG. 5B in which three flexible drive-members 130A belonging to a first drive-member set 139A are followed by four flexible drive members 130B belonging to a second drive-member set 139B. The arrows labeled "$CD_A$" and "$CD_B$" indicate that each drive-member set 139A and 139B is alternatively cyclable in each of the first and second cycling directions $CD_A$ and $CD_B$. An arrangement such as that depicted in FIG. 5B is adaptable to multiple applications. For instance, it will be appreciated, especially with reference to FIG. 6, which represents a bi-directional transition module 100 adapted for alternative transfer to orthogonally extending first and second secondary conveyors 300 and 400, and FIG. 7, which represents a bi-directional transition module 100 installed for alternative diversion to first and second secondary conveyors 300 and 400 extending from, respectively, the left and right sides of the primary conveyor 200.

Figure 6:
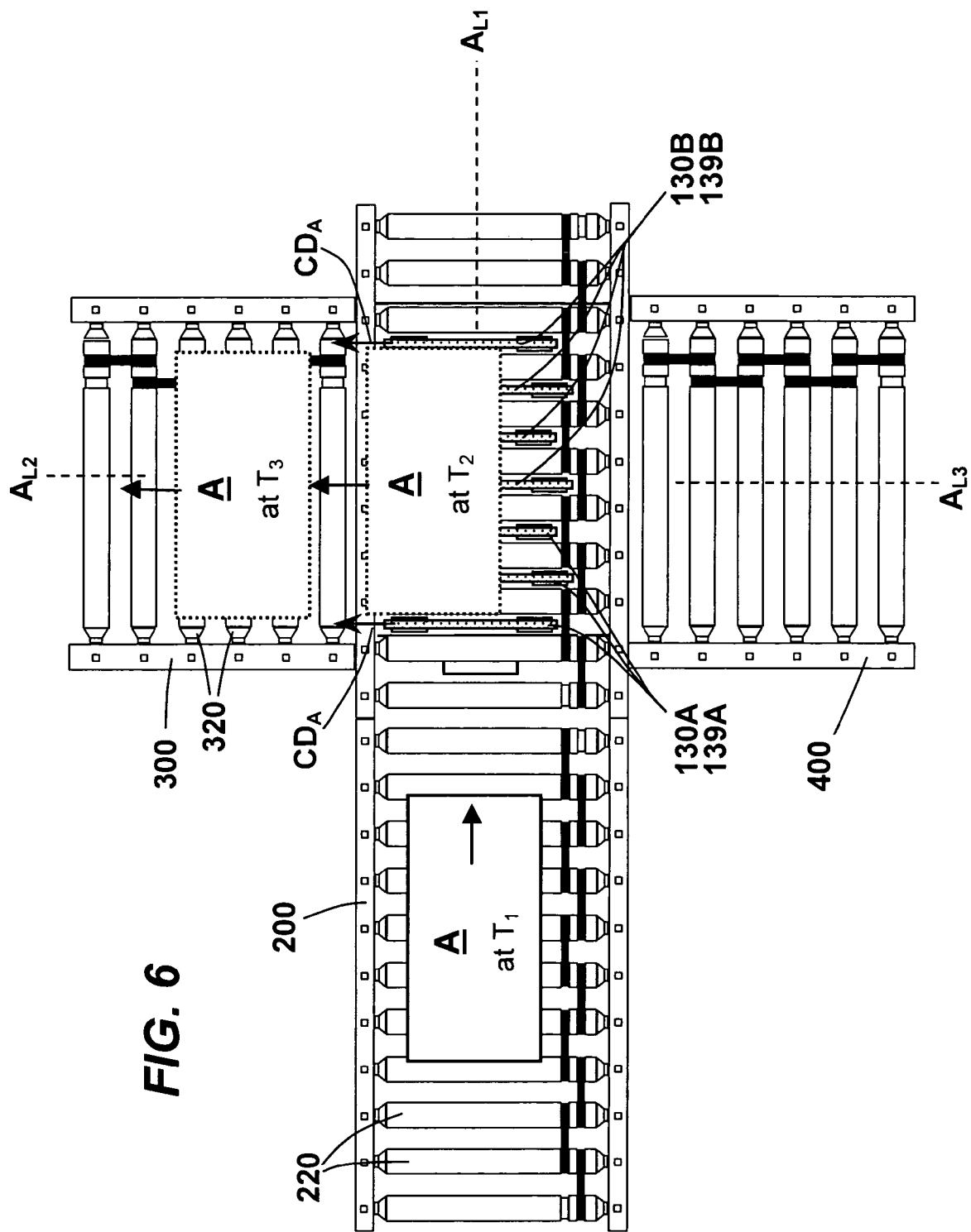
FIG. 6 is a top view of an illustrative bi-directional transition module cooperatively coupled with a primary roller conveyor to facilitate the alternative transfer of articles from the primary roller conveyor to first and second secondary conveyors orthogonally extending from left and right sides of the primary conveyor and, furthermore, showing successive positions in the advancement of an article being transferred.

Referring to the arrangement depicted in FIG. 6, an article A is shown translating along a primary conveyor 100 toward the directional transition region including a bi-directional transition module 100. In this case, it may be desirable to have the article A over as many flexible drive members 130 as possible before cycling is initialized in order, for example, to maintain the angular orientation of the article A as it is transferred to one of the first and second secondary conveyors 300 and 400. Assuming that the bi-directional transition module shown in FIG. 6 is like the bi-directional transition module of FIG. 5A, for instance, then at a predetermined time in the translation of the article A along the primary conveyor 100, cycling in the same cycling direction (i.e., either $CD_A$ or $CD_B$) of each of the first and second drive-member sets 139A and 139B is initialized such that flexible drive members 130A and 130B belonging to each of the first and second drive-member sets 139A and 139B engage, lift and move the article A to one of the two adjacent secondary conveyors 300 and 400. The article A is shown on the primary conveyor 100 at some time $T_1$ before transfer and, in phantom lines, at times $T_2$ during transfer and $T_3$ subsequent to transfer.

Figure 7:
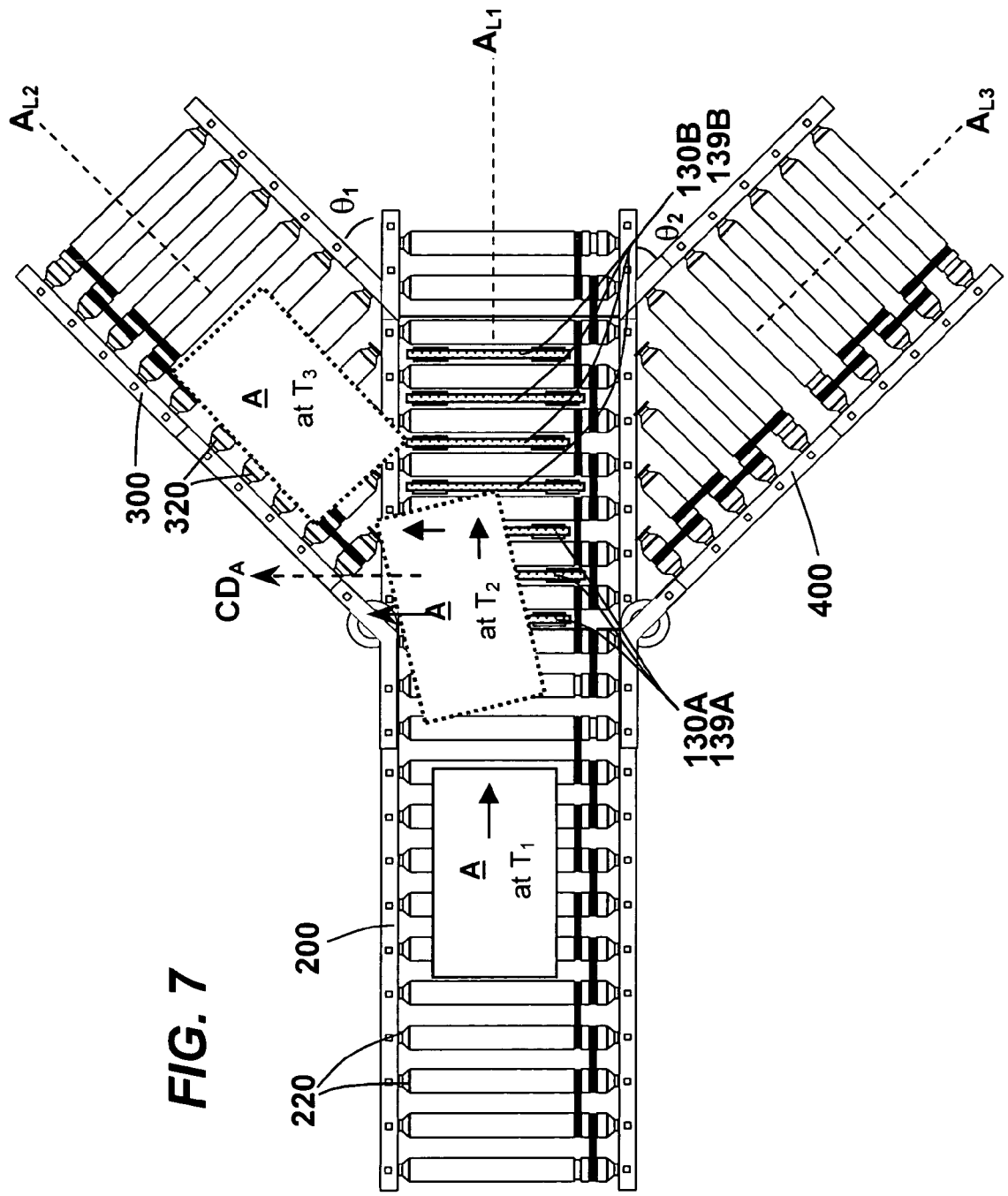
FIG. 7 is a top view showing successive positions in the advancement of an article being diverted by an illustrative bi-directional transition module cooperatively coupled with a primary roller conveyor from which extend, at acute angles from left and right sides, first and second secondary conveyors.

Referring to the arrangement depicted in FIG. 7, an article A is shown translating along a primary conveyor 100 toward the directional transition region including a bi-directional transition module 100. In this case, it is not necessary and, in fact may be undesirable, to have the article A disposed over as many flexible drive members 130 as possible before cycling is initialized. Because this article A is to be diverted, all that need be achieved is the rotation of the leading end of the article A toward the adjacent conveyor 300 to which the article A is being diverted as shown, for example, in the depiction of article A at time $T_2$. This is particularly the case when, as depicted, the rollers 320 of the secondary conveyor 300 to which the article A is to be diverted are powered rollers (as indicated by the belts disposed about rollers 320). Therefore, contrary to the transfer situation depicted in FIG. 6, it is frequently not necessary or desirable to maintain the angular orientation of the article A as it is diverted to one of the first and second secondary conveyors 300 and 400 as shown in FIG. 7. Accordingly, assuming that the bi-directional transition module 100 shown in FIG. 7 is similar to the bi-directional transition module of FIG. 5A, for instance, then at a predetermined time in the translation of the article A along the primary conveyor 100, cycling in the appropriate cycling direction (i.e., either $CD_A$ or $CD_B$) of only the first drive-member set 139A is such that flexible drive members 130A belonging to the first drive-member set 139A engage, lift the leading edge of and rotate the article A toward one of the two adjacent secondary conveyors 300 and 400 (conveyor 300 in the example). The article A is shown on the primary conveyor 100 at some time $T_1$ before diversion and, in phantom lines, at times $T_2$ during diversion and $T_3$ subsequent to diversion. In an alternative implementation, the second drive-member set 139B is caused to cycle in accordance with a predetermined delay after the cycling of the first drive-member set 139A is initialized.

Having examined FIGS. 6 and 7, and the textual descriptions above associated with the same, one will appreciate that possible, and within the scope and contemplation of the invention, are configurations in which (i) adjacent one side of the primary conveyor 100 is an orthogonally extending first secondary conveyor 300 to which articles A are to be transferred and (ii) adjacent the other side of the primary conveyor 100 is a second secondary conveyor 300 extending from the primary conveyor 100 at an acute angle to which articles A are to be diverted. In one such embodiment, transfer of articles to the first secondary conveyor 300 occurs as described in connection with FIG. 6 and diversion to the second secondary conveyor 400 occurs as described in association with FIG. 7. Moreover, it will be appreciated that a single embodiment as illustrated in FIG. 5A is adaptable to either of the two situations illustrated in FIGS. 6 and 7 and to the third situation described in this paragraph. The versatility of such a single embodiment obviates, or at least substantially reduces, the need for various, dedicated directional transition modules throughout a material-handling facility.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A directional transition module for moving an article translating on a primary roller conveyor having left and right sides and extending along a first axis to a secondary conveyor for translation along a second axis angularly disposed with respect to the first axis, the directional transition module comprising:
   a chassis; and
   a first drive-member set including at least one belt supported by the chassis for cycling through a predetermined driver cycle having an upper cycle portion and a lower cycle portion, the upper cycle portion being such that, when the directional transition module is installed for use in conjunction with the primary roller conveyor, the at least one belt is capable of cycling between first and second rollers of the primary roller conveyor, the at least one belt including a first segment and a second segment, the first segment having a profile sufficiently low such that, when the first segment cycles through the upper cycle portion, no section of the first segment extends above a plane defined by the tops of the first and second rollers, and the second segment having a profile sufficiently high such that, when the second segment cycles through the upper cycle portion, at least one section of the second segment extends above the plane defined by the tops of the first and second rollers to engage the article for directional transition, wherein at least one of the at least one belts further includes at least one tapered transition region that gradually increases in thickness between the first and second segments.

2. The directional transition module of claim 1 wherein the at least one belt of the first drive-member set comprises at least two belts and wherein each of at least two of the at least two belts is driven by a drive wheel carried for rotation by a first common drive shaft carrying for rotation the drive wheel of at least one other belt.

3. The directional transition module of claim 2 wherein the first common drive shaft is driven by a motor that is alternatively energizeable for rotation in each of first and second opposite rotation directions such that the directional transition module is a bi-directional transition module adapted to service each of (i) a first secondary conveyor adjacent the left side of the primary roller conveyor and (ii) a second secondary conveyor adjacent the right side of the primary roller conveyor by cycling the belts of the first drive-member set in, respectively, a first cycling direction and a second cycling direction.

4. The directional transition module of claim 1 wherein the at least one belt of the first drive-member set is driven by a motor that is alternatively energizeable for rotation in each of first and second opposite rotation directions such that the directional transition module is a bi-directional transition module adapted to service each of (i) a first secondary conveyor adjacent the left side of the primary roller conveyor and (ii) a second secondary conveyor adjacent the right side or the primary roller conveyor by cycling the at least one belt of the first drive-member set in, respectively, a first cycling direction and a second cycling direction.

5. The directional transition module of claim 1 further comprising a second drive-member set including at least one endless flexible drive member supported by the chassis for cycling through a predetermined driver cycle having an upper cycle portion and a lower cycle portion, the upper cycle portion being such that, when the directional transition module is installed for use in conjunction with the primary roller conveyor, the at least one flexible drive member is capable of cycling between first and second rollers of the primary roller conveyor, the at least one flexible drive member including a first segment and a second segment, the first segment having a profile sufficiently low such that, when the first segment cycles through the upper cycle portion, no section of the first segment extends above a plane defined by the tops of the first and second rollers, and the second segment having a profile sufficiently high such that, when the second segment cycles through the upper cycle portion, at least one section of the second segment extends above the plane defined by the tops of the first and second rollers,
   wherein, (i) the at least one belt of the first drive-member set is capable of cycling through the upper cycle portion in a direction orthogonal to the first axis, (ii) the at least one flexible drive member of the second drive-member set is capable of cycling through the upper cycle portion in a direction orthogonal to the first axis, (iii) the cycling of the at least one belt in the first drive-member set is independent of the is capable of cycling of the at least one drive member in the second drive member set, and (iv) at least one of (a) the at least one belt of the first drive-member set and (b) the at least one drive member of the second drive-member set is alternatively cyclable in each of a first cycling direction and a second cycling direction opposite the first cycling direction such that the directional transition module is a bi-directional transition module adapted to service each of (i) a first secondary conveyor adjacent the left side of the primary conveyor module and (ii) a second secondary conveyor adjacent the right side of the primary conveyor.

6. The bi-directional transition module of claim 5 wherein (i) the at least one belt of the of the first drive-member set and (ii) the at least one flexible drive member of the second drive-member set are driven by, respectively, a first common drive shaft and a second common drive shaft.

7. The directional transition module of claim 5 wherein (i) the at least one flexible drive member of the second drive-member is a belt and (ii) the at least one belt of each of the first and second drive-member sets is alternatively cyclable in each of a first cycling direction and a second cycling direction opposite the first cycling direction.

8. The directional transition module of claim 7 wherein one of (i) the first and second drive-member sets are serially arranged with respect to the translation direction of an article translating along the primary conveyor; and (ii) drive members of the first and second drive-member sets are alternatingly interspersed.

9. The directional transition module of claim 1 further comprising a second drive-member set including at least one endless flexible drive member supported by the chassis for cycling through a predetermined driver cycle having an upper cycle portion and a lower cycle portion, the upper cycle portion being such that, when the directional transition module is installed for use in conjunction with the primary roller conveyor, the at least one flexible drive member is capable of cycling between first and second rollers of the primary roller conveyor, the at least one flexible drive member including a first segment and a second segment, the first segment having a profile sufficiently low such that, when the first segment cycles through the upper cycle portion, no section of the first segment extends above a plane defined by the tops of the first and second rollers, and the second segment having a profile sufficiently high such that, when the second segment cycles through the upper cycle portion, at least one section of the second segment extends above the plane defined by the tops of the first and second rollers, wherein, (i) the at least one belt of the first drive-member set is capable of cycling through the upper cycle portion in a first direction orthogonal to the first axis, (ii) the at least one flexible drive member or the second drive-member set is capable of cycling through the upper cycle portion in a second direction anti-parallel to the first direction, and (iii) the cycling of the at least one belt in the first drive-member set is independent of, and mutually exclusive with, the cycling of the at least one drive member in the second drive member set such that the directional transition module is a bi-directional transition module adapted to service each of (i) a first secondary conveyor adjacent the left side of the primary conveyor module and (ii) a second secondary conveyor adjacent the right side of the primary conveyor.

10. The bi-directional transition module of claim 9 wherein drive members of the first and second drive-member sets are alternatingly interspersed.

11. The bi-directional transition module of claim 9 wherein the flexible drive members of the oppositely-cycling first and second drive-member sets are driven by, respectively, a first common drive shaft dedicated to rotation in a single first rotation direction and a second common drive shaft dedicated to rotation in a single second rotation direction opposite the first rotation direction.

12. The bi-directional transition module of claim 11 wherein the first and second drive-member sets are alternatingly interspersed.

13. A bi-directional transition module for changing the translation direction of an article translating on a primary roller conveyor along a first axis by moving the article to a selected one of (i) a first secondary conveyor for translation along a second axis angularly disposed at a first angle with respect to the first axis and (ii) a second secondary conveyor for translation along a third axis angularly disposed at a second angle with respect to the first axis, the directional transition module comprising:

a chassis; and first and second drive-member sets, each drive-member set including at least one endless flexible drive member supported by the chassis for cycling through a predetermined driver cycle having an upper cycle portion and a lower cycle portion, the upper cycle portion being such that, when the bi-directional transition module is installed for use in conjunction with the primary roller conveyor, the at least one flexible drive member is capable of cycling between first and second rollers of the primary roller conveyor, the at least one flexible drive member including a first segment and a second segment, the first segment having a profile sufficiently low such that, when the first segment cycles through the upper cycle portion, no section of the first segment extends above a plane defined by the tops of the first and second rollers, and the second segment having a profile sufficiently high such that, when the second segment cycles through the upper cycle portion, at least one section of the second segment extends above the plane defined by the tops of the first and second rollers, wherein (i) at least one of the least one flexible drive members of at least one of the first and second drive-members sets includes at least one tapered transition region that gradually increases in thickness between the first and second segments, (ii) the at least one flexible drive member of the first drive-member set is capable of cycling through the upper cycle portion in a direction orthogonal to the first axis, (iii) the at least one flexible drive member of the second drive-member set is capable of cycling through the upper cycle portion in a direction orthogonal to the first axis, (iv) the cycling of the at least one drive member in the first drive-member set is independent of the cycling of the at least one drive member in the second drive member set and (v) at least one of (a) the at least one flexible drive member of the first drive-member set and (b) the at least one flexible drive member of the second drive-member set is alternatively cyclable in each of a first cycling direction and a second cycling direction opposite the first cycling direction.

14. The bi-directional transition module of claim 13 wherein the at least one flexible drive member of each of the first and second drive-member sets is alternatively cyclable in each of a first cycling direction and a second cycling direction opposite the first cycling direction.

15. The bi-directional transition module of claim 13 wherein each flexible drive member of at least one of the first and second drive-member sets comprises a belt.

16. The bi-directional transition module of claim 15 wherein (i) the at least one flexible drive member of the of the first drive-member set and (ii) the at least one flexible drive member of the second drive-member set are driven by, respectively, a first common drive shaft and a second common drive shaft.

17. The bi-directional transition module of claim 16 wherein, in order to achieve the condition that at least one of (a) the at least one flexible drive member of the first drive-member set and (b) the at least one flexible drive member of the second drive-member set is alternatively cyclable in each of a first cycling direction and a second cycling direction opposite the first cycling direction, at least one of the first and second common drive shafts is driven by motor that is alternatively energizeable for rotation in each of first and second opposite rotation directions.

18. A directional transition module for moving an article translating on a primary roller conveyor having left and right sides and extending along a first axis to a secondary conveyor for translation along a second axis angularly disposed with respect to the first axis, the directional transition module comprising:
   a chassis; and
   a drive-member set including at least two endless flexible belts, each belt being supported by the chassis for cycling through a predetermined driver cycle having an upper cycle portion and a lower cycle portion, the upper cycle portion being such that, when the directional transition module is installed for use in conjunction with the primary roller conveyor, each of the at least two belts cycles between first and second rollers of the primary roller conveyor, at least one of the at least two belts including a first segment and a second segment, the first segment having a profile sufficiently low such that, when the first segment is capable of cycling through the upper cycle portion, no section of the first segment extends above a plane defined by the tops of the first and second rollers, and the second segment having a profile sufficiently high such that, when the second segment cycles through the upper cycle portion, at least one section of the second segment extends above the plane defined by the tops of the first and second rollers in order to engage the article for directional transition, wherein at least two of the at least two belts of the drive-member set are driven by a common drive shaft.

19. The directional transition module of claim 18 wherein at least one of the at least one belts including first and second segments of, respectively, relatively low and relatively high profile further includes at least one tapered transition region that gradually increases in thickness between the first and second segments.

* * * * *